United States Patent
Ogasawara et al.

(10) Patent No.: US 6,503,974 B1
(45) Date of Patent: Jan. 7, 2003

(54) VIBRATION-DAMPING THERMOPLASTIC RESIN COMPOSITION AND MOLDED ARTICLE THEREFROM

(75) Inventors: Satoshi Ogasawara, Chiyoda-ku (JP); Nobuyuki Arakawa, Shinagawa-ku (JP)

(73) Assignees: Teijin Chemicals, Ltd., Tokyo (JP); Sony Corporation, Tokyo (JP)

( * ) Notice: Subject to any disclaimer, the term of this patent is extended or adjusted under 35 U.S.C. 154(b) by 0 days.

(21) Appl. No.: 09/913,275

(22) PCT Filed: Dec. 7, 2000

(86) PCT No.: PCT/JP00/08668

§ 371 (c)(1), (2), (4) Date: Aug. 13, 2001

(87) PCT Pub. No.: WO01/44372

PCT Pub. Date: Jun. 21, 2001

(30) Foreign Application Priority Data

Dec. 14, 1999 (JP) .............................. 11-354375

(51) Int. Cl.⁷ .............................. C08J 3/00; C08K 3/04; C08L 73/00; C08L 51/00; C08L 69/00
(52) U.S. Cl. .................. 524/495; 524/496; 524/508; 524/537
(58) Field of Search .............. 524/495, 496, 524/508, 537

(56) References Cited

U.S. PATENT DOCUMENTS 5,104,723 A    4/1992   Freitag et al.
5,132,154 A    7/1992   Westeppe et al.
5,280,070 A    1/1994   Drzewinski

FOREIGN PATENT DOCUMENTS

| | | |
|---|---|---|
| EP | 0-362646 A2 | 9/1989 |
| EP | 0-402678 A2 | 5/1990 |
| JP | 03-215551 | 9/1991 |
| JP | 05-311027 | 11/1993 |
| JP | 06-041443 | 2/1994 |
| JP | 06-128475 | 5/1994 |
| JP | 09-040840 | 2/1997 |

*Primary Examiner*—Patrick D. Niland
(74) *Attorney, Agent, or Firm*—Sherman & Shalloway

(57) ABSTRACT

A vibration-damping thermoplastic resin composition comprising (a) 50 to 90 wt % of an amorphous thermoplastic resin (component A) having a loss tangent (tan δ) value of 0.01 to 0.04 and a deflection temperature under load of not lower than 120° C. and (b) 50 to 10 wt % of a methyl methacrylate resin (component B), wherein an article molded from the resin composition has the following physical properties (1) to (4), i.e., (1) a loss factor of 0.04 to 0.08, (2) a water absorption of not higher than 0.30 wt %, (3) a specific gravity of 1.05 to 1.3, and (4) a deflection temperature under load of 110 to 170° C.; and an article molded therefrom. According to the present invention, a thermoplastic resin composition and an article molded therefrom which are excellent in vibration dampability as well as dimensional accuracy, rigidity and heat resistance and are light in weight, is provided.

22 Claims, No Drawings

VIBRATION-DAMPING THERMOPLASTIC RESIN COMPOSITION AND MOLDED ARTICLE THEREFROM

DETAILED DESCRIPTION OF THE INVENTION

1. Technical Field of the Invention

The present invention relates to a vibration-damping thermoplastic resin composition and an article molded therefrom. More specifically, it relates to a thermoplastic resin composition in which the thermoplastic resin comprises a specific amorphous thermoplastic resin and a methyl methacrylate resin and which is excellent in vibration dampability as well as dimensional accuracy, rigidity and heat resistance and is low in weight; and an article molded therefrom.

2. Prior Art

In recent years, along with an increase in the speeds of writing and reading information in office automation equipment, the demand for imparting the vibration dampability against the vibration source produced by a driving system to the components constituting the equipment has been growing together with the demand for improving the rigidity and heat resistance of each of the components, and it has also been demanded that the vibration dampability be imparted to a thermoplastic resin composition and an article molded therefrom. For example, for an optical disk such as CD-ROM, a so-called high-speed revolution of at least 30 times is on its way to becoming mainstream. In this case, a turntable which directly acts on the revolution of the disk, chassis for supporting these, and the like are demanded to have good vibration dampability. Similarly, for an optical printer, high-speed revolving polygon mirrors, optical boxes or supporting the mirrors, and the like are demanded to have good vibration dampability and, along with an increase in the printing speed, the demand for the good vibration dampability has also been increasing.

However, since a thermoplastic resin alone generally has extremely poor vibration dampability, there is the problem that it lacks vibration dampability against an increase in the speeds of the office automation equipment mentioned above. Rubber is an example of a material having high vibration dampability. However, since such a material lacks rigidity, an inorganic filler or the like must be filled densely in the material. As a result, the material has a high specific gravity, whereby it cannot satisfy the demand. The material must be light in weight for high-speed revolution, and the lighter the weight is, the higher the natural frequency becomes. Further, to adapt to a high-temperature environment caused by the environment under which the equipment is used and/or by the heat generated by the internal components of the equipment, heat resistance is also an important factor. Such highly demanded properties can never be achieved when rubber is used as the thermoplastic resin.

Meanwhile, in addition to rubber, a liquid crystal polymer such as a wholly aromatic polyester is known as a resin having high vibration dampability. However, since the resin is a crystalline resin which exhibits extremely strong anisotropy, an article molded therefrom is liable to warp, so that it cannot be sufficiently applied to the fields in which high dimensional accuracy is desired. Further, as to the dimensional accuracy, factors associated with time are also important, and low water absorption is also desired.

Japanese Patent Laid-Open Publication No. 9-40840 proposes a resin composition with high rigidity and excellent vibration dampability which is obtained by adding a vibration-damping elastomer and a specific whisker into a thermoplastic resin. The resin composition, however, cannot satisfy all the above currently demanded properties such as vibration dampability, low specific gravity and small warpage of a molded article at high levels.

Problems to be Solved by the Invention

It is the object of the present invention to provide a thermoplastic resin composition which has not only good vibration dampability but also excellent dimensional accuracy, rigidity and heat resistance and is light in weight; and an article molded therefrom.

The present inventors have made intense studies to attain the object. As a result, it has been found that the above object can be attained by a thermoplastic resin composition obtained by mixing an amorphous thermoplastic resin having a specific loss tangent (tan δ) value and a deflection temperature under load of not lower than a given temperature and a methyl methacrylate resin in a specific ratio. The present invention has been completed by this finding.

Means for Solving the Problems

That is, according to the present invention, there is provided a vibration-damping thermoplastic resin composition comprising (a) 50 to 90 wt % of an amorphous thermoplastic resin (component A) having a loss tangent (tan δ) value measured at 40° C. and 18 Hz in accordance with JIS K7198 of 0.01 to 0.04 and a deflection temperature under load measured under a load of 1.82 MPa in accordance with ASTM D648 of not lower than 120° C. and (b) 50 to 10 wt % of a methyl methacrylate resin (component B), wherein an article molded from this resin composition has the following physical properties (1) to (4), i.e., (1) a loss factor of 0.04 to 0.08, (2) a water absorption measured when immersed in water at 23° C. for 24 hours in accordance with ASTM D570 of not higher than 0.30 wt %, (3) a specific gravity measured in accordance with JIS K7112 of 1.05 to 1.3, and (4) a deflection temperature under load measured under a load of 1.82 MPa in accordance with ASTM D648 of 110 to 170° C.

The thermoplastic resin composition of the present invention and an article molded therefrom will be described in more detail hereinafter.

The thermoplastic resin used as the component A of the present invention is an amorphous resin having a loss tangent (tan δ) value measured at 40° C. and 18 Hz in accordance with JIS K7198 of 0.01 to 0.04. The tan δ is preferably 0.012 to 0.035. When it is smaller than 0.01, the vibration dampability of the vibration-damping thermoplastic resin composition of the present invention is not satisfactory, while when it is larger than 0.04, it is not preferable from the viewpoint of dimensional accuracy. Further, the thermoplastic resin used as the component A has a deflection temperature under load measured under a load of 1.82 MPa in accordance with ASTM D648 of not lower than 120° C., preferably not lower than 122° C. A representative resin which satisfies these conditions is selected from an aromatic polycarbonate resin, a polysulfone resin, an amorphous polyarylate resin and a cyclic polyolefin resin (such as a polynorbornene resin) which satisfy the conditions. Of these, the aromatic polycarbonate resin or the cyclic polyolefin resin is preferable, and the aromatic polycarbonate resin is particularly preferable. These may be used alone or in admixture of two or more, and even when resins are of the same type, they may be used alone or in admixture of two or more.

According to the studies of the present inventors, it has been found that an aromatic polycarbonate resin obtained as the component A by using a bisphenol having the following specific structure is a particularly suitable resin which as a loss tangent (tan δ) value and a deflection temperature under load that satisfy the above suitable ranges and which can constitute a resin composition having excellent dimensional accuracy, heat resistance and rigidity.

That is, the aromatic polycarbonate resin which is suitable as the component A is exemplified by a polycarbonate resin containing 1,1-bis(4-hydroxyphenyl)-3,3,5-trimethylcyclohexane represented by the following structural formula (1) (to be sometimes abbreviated as "bisphenol TMC" hereinafter) in a proportion of at least 20 mol % based on 100 mol % of the total of all aromatic dihydroxy components.

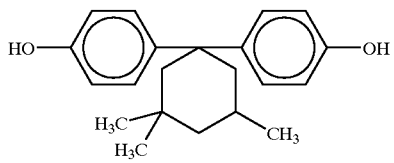

(1)

That is, the aromatic polycarbonate resin which is preferable as the component A contains the above bisphenol TMC in a proportion of at least 20 mol %, preferably 30 to 80 mol %, based on 100 mol % of the total of all aromatic dihydroxy components. When the proportion of the bisphenol TMC is higher than or equal to 20 mol %, the thermoplastic resin composition has a high loss tangent (tan δ) value, excellent vibration dampability and low water absorption, and better dimensional stability can be attained accordingly. On the other hand, when the proportion of the bisphenol TMC exceeds 80 mol %, the water absorption is liable to become high. Therefore, when the proportion of the bisphenol TMC is as high as described above, it is desirable to modify terminals by a specific terminal-group modifier as described hereinafter.

The above aromatic polycarbonate resin preferably contains the above bisphenol TMC in a given proportion as an aromatic dihydroxy component. Means employed for obtaining desired properties, particularly a water absorption of not higher than 0.2 wt %, preferably not higher than 0.15 wt %, are roughly classified into two means, one of which comprises mixing a specific dihydroxy component with the above bisphenol TMC to produce a copolycarbonate resin and the other of which comprises introducing a terminal modifier having a specific structure into terminal groups. These two means may be used solely or in combination.

According to the studies of the present inventors, it has been found that the copolycarbonate resin obtained by mixing the specific dihydroxy component with the above bisphenol TMC is particularly suitable as the component A of the vibration-damping thermoplastic resin composition. That is, as the component A of the present invention, a copolycarbonate resin is particularly preferable which contains (a) bisphenol TMC (component a) and (b) at least one aromatic dihydroxy component (component b) selected from 4,4'-(m-phenylenediisopropylidene)diphenol (to be sometimes abbreviated as "bisphenol M" hereinafter) represented by the following structural formula [2] and 2,2-bis (3-methyl-4-hydroxyphenyl)propane (to be sometimes abbreviated as "bisphenol C" hereinafter) represented by the following structural formula [3] in a proportion of at least 80 mol % out of 100 mol % of the total of all aromatic dihydroxy components and which contains the component a and the component b in a molar ratio of 20:80 to 80:20.

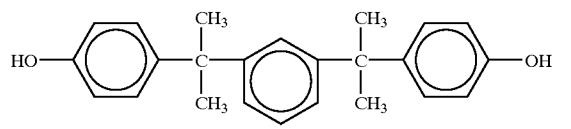

(2)

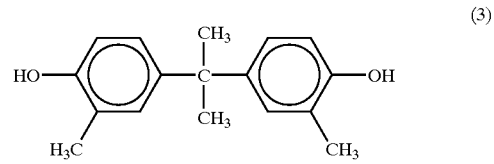

(3)

One preferable embodiment of the above copolycarbonate resin is a copolycarbonate resin containing bisphenol TMC as the component a and bisphenol M as the component b in a molar ratio of 30:70 to 80:20, particularly preferably 40:60 to 70:30.

Another preferable embodiment of the above copolycarbonate resin is a copolycarbonate resin containing bisphenol TMC as the component a and bisphenol C as the component b in a molar ratio of 30:70 to 80:20, particularly preferably 40:60 to 70:30.

In these preferable embodiments, it is advantageous that the total of the component a and the component b is at least 80 mol %, preferably at least 90 mol %, out of 100 mol % of the total of all aromatic dihydroxy components. Typically, a copolycarbonate resin which substantially comprises the component a and the component b is desirable.

Meanwhile, although it is desirable that the aromatic polycarbonate resin which is preferably used as the component A in the present invention contain the above components a and b in a proportion of at least 80 mol % preferably at least 90 mol %, out of 100 mol % of the total of all aromatic dihydroxy components, it may also contain other dihydroxy component (component c) in a proportion of not higher than 20 mol %, preferably not higher than 10 mol %, out of 100 mol % of the total of all aromatic dihydroxy components.

The component c may be any component other than the above components a and b which is commonly used as a dihydroxy component of an aromatic polycarbonate. Illustrative examples of the component usable as the component c include hydroquinone, resorcinol, 4,4'-biphenol, 1,1-bis(4-hydroxyphenyl)ethane,
2,2-bis(4-hydroxyphenyl)propane,
2,2-bis(4-hydroxyphenyl)butane,
1,1-bis(4-hydroxyphenyl)-1-phenylethane,
1,1-bis(4-hydroxyphenyl)cyclohexane,
2-bis(4-hydroxyphenyl)pentane,
4,4'-(p-phenylenediisopropylidene)diphenol,
9,9-bis(4-hydroxyphenyl)fluorene, and
1,1-bis(4-hydroxyphenyl)-4-isopropylcyclohexane.

Further, the aromatic polycarbonate resin may contain branching components in the polymer by further containing a polyfunctional aromatic compound having at least three functionalities or as a result of isomerization at the time of polymerization. Illustrative examples of the polyfunctional aromatic compound having at least three functionalities include fluoroglucine; fluoroglucide; trisphenols such as 4,6-dimethyl-2,4,6-tris(4-hydroxydiphenyl)heptene-2,
2,4,6-trimethyl-2,4,6-tris(4-hydroxyphenyl)heptane,
1,3,5-tris(4-hydroxyphenyl)benzene,
1,1,1-tris(4-hydroxyphenyl)ethane,
1,1,1-tris(3,5-dimethyl-4-hydroxyphenyl)ethane,
2,6-bis(2-hydroxy-5-methylbenzyl)-4-methylphenol; and
4-{4-[1,1-bis(4-hydroxyphenyl)ethyl]benzene}-α,α-dimethylbenzylphenol; tetra(4-hydroxyphenyl)methane;
bis(2,4-dihydroxyphenyl)ketone;
1,4-bis(4,4-dihydroxytriphenylmethyl)benzene; and
trimellitic acid, pyromellitic acid,
benzophenonetetracarboxylic acid, and acid chlorides thereof. Of these, 1,1,1-tris(4-hydroxyphenyl)ethane and 1,1,1-tris(3,5-dimethyl-4-hydroxyphenyl)ethane are preferable, and 1,1,1-tris(4-hydroxyphenyl)ethane is particularly preferable.

The aromatic polycarbonate resin used as the component A of the present invention is produced by a commonly used reaction means known per se for producing an aromatic polycarbonate resin, for example, a method in which the aromatic dihydroxy components are caused to react with a carbonate precursor such as phosgene or carbonic diester. next, a brief description will be given to a basic means for carrying out such a production method.

The reaction by a solution method is generally a reaction between a dihydric phenol and phosgene and is carried out in the presence of an acid binder and an organic solvent. As the acid binder, an alkali metal hydroxide such as sodium hydroxide or potassium hydroxide or an amine compound such as pyridine is used. As the organic solvent, a halogenated hydrocarbon such as methylene chloride or chlorobenzene is used. Further, to accelerate the reaction, catalysts such as tertiary amines, quaternary ammonium compounds and quaternary phosphonium compounds, e.g., triethylamine, tetra-n-butylammonium bromide and tetra-n-butylphosphonium bromide can be used. In that case, it is preferable that the reaction temperature be generally 0 to 40° C., the reaction time be 10 minutes to 5 hours and the pH during the reaction be maintained at 9 or higher.

Further, in the polymerization reaction, a terminator is generally used. As the terminator, a monofunctional phenol can be used. The monofunctional phenol is generally used as a terminator for controlling a molecular weight, and since the obtained polycarbonate resin has its terminals terminated by monofunctional phenol-based groups, it has excellent thermal stability as compared with the one whose terminals are not terminated by the monofunctional phenol-based groups. The monofunctional phenol is generally a phenol or a lower alkyl-substituted phenol and can be exemplified by the monofunctional phenol represented by the following general formula [4].

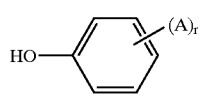

(4)

(In the above formula, A is a hydrogen atom or a linear or branched alkyl group or phenyl-group-substituted alkyl group having 1 to 9 carbon atoms, and r is an integer of 1 to 5, preferably 1 to 3.)

Illustrative examples of the above monofunctional phenol include phenol, p-tert-butylphenol, p-cumylphenol and isooctylphenol.

Further, other monofunctional phenols can be exemplified by phenols having a long-chain alkyl group or aliphatic polyester group as a substituent, benzoyl chloride or long-chain alkyl carboxylic acid chlorides. Of these, phenols having a long-chain alkyl group as a substituent and represented by the following general formulae [5] and [6] are preferably used.

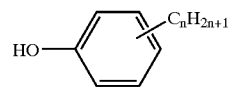

(5)

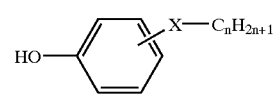

(6)

(In the above example, X represents —R—O—, —R—CO—O— or —R—O—CO— wherein R represents a single bond or a divalent aliphatic hydrocarbon group having 1 to 10 carbon atoms, preferably 1 to 5 carbon atoms, and n represents an integer of 10 to 50.)

The substituted phenols of the general formula [5] are preferably those whose n is 10 to 30, particularly preferably 10 to 26. Illustrative examples of the substituted phenols include decylphenol, dodecylphenol, tetradecylphenol, hexadecylphenol, octadecylphenol, eicosylphenol, docosylphenol and triacontylphenol.

Meanwhile, the substituted phenols of the general formula [6] are suitably those whose X represents —R—CO—O—, R represents a single bond, and n is 10 to 30, particularly suitably 10 to 26. Illustrative examples of the substituted phenols include decyl hydroxybenzoate, dodecyl hydroxybenzoate, tetradecyl hydroxybenzoate, hexadecyl hydroxybenzoate, eicosyl hydroxybenzoate, docosyl hydroxybenzoate and triacontyl hydroxybenzoate.

The terminator is desirably introduced into at least 5 mol %, preferably at least 10 mol % of all terminals of the obtained polycarbonate resin. It is more preferable that the terminator be introduced into at least 80 mol % of all terminals, that is, the proportion of the terminal hydroxyl group (OH group) derived from the dihydric phenol be 20 mol % or less, and it is particularly preferable that the terminator be introduced into at least 90 mol % of all terminals, that is, the proportion of the OH group be 10 mol % or less. The terminators may be used solely or in admixture of two or more.

The reaction by a melting method is generally an ester interchange reaction between a dihydric phenol and a carbonate and is carried out by a method comprising mixing the dihydric phenol with the carbonate under heat in the presence of an inert gas and distilling out a produced alcohol or phenol. Although the reaction temperature varies depending on the boiling point of the alcohol or phenol produced or the like, it is generally 120 to 350° C. At the late stage of the reaction, the pressure of the system is reduced to 1,333 to 13.3 Pa to facilitate distilling out the alcohol or phenol produced. The reaction time is generally 1 to 4 hours.

Illustrative examples of the carbonate include esters such as an aryl group and an aralkyl group which have 6 to 10 carbon atoms and may be substituted, and an alkyl group having 1 to 4 carbon atoms. Specific examples of the carbonate include diphenyl carbonate, bis(chlorophenyl) carbonate, dinaphthyl carbonate, bis(diphenyl)carbonate, dimethyl carbonate, diethyl carbonate and dibutyl carbonate. Of these, diphenyl carbonate is preferable.

Further, a polymerization catalyst can be used to increase the rate of polymerization. As the polymerization catalyst, there can be used catalysts which are commonly used in an esterification reaction or ester interchange reaction, as exemplified by alkali metal compounds such as sodium hydroxide, potassium hydroxide and sodium and potassium salts of dihydric phenols, alkaline earth metal compounds such as calcium hydroxide, barium hydroxide and magnesium hydroxide, nitrogen-containing basic compounds such as tetramethylammonium hydroxide, tetraethylammonium hydroxide, trimethylamine and triethylamine, alkoxides of alkali metals and alkaline earth metals, organic acid salts of alkali metals and alkaline earth metals, zinc compounds, boron compounds, aluminum compounds, silicon compounds, germanium compounds, organotin compounds, lead compounds, osmium compounds, antimony compounds, manganese compounds, titanium compounds and zirconium compounds. These catalysts may be used solely or in combination of two or more. These catalysts are used in an equivalent amount of preferably $1 \times 10^{-8}$ to $1 \times 10^{-3}$, more preferably $1 \times 10^{-7}$ to $5 \times 10^{-4}$, per mole of the dihydric phenol used as a raw material.

Further, in the polymerization reaction, to reduce phenolic terminal groups, such compounds as bis(chlorophenyl) carbonate, bis(bromophenyl)carbonate, bis(nitrophenyl) carbonate, bis(phenylphenyl)carbonate, chlorophenylphenyl carbonate, bromophenylphenyl carbonate, nitrophenylphenyl carbonate, phenylphenyl carbonate, methoxycarbonylphenylphenyl carbonate, and ethoxycarbonylphenylphenyl carbonate are preferably added at the late stage or after the completion of the polycondensation reaction. Of such compounds, 2-chlorophenylphenyl carbonate, 2-methoxycarbonylphenylphenyl carbonate, and 2-ethoxycarbonylphenylphenyl carbonate are preferably used, and 2-methoxycarbonylphenylphenyl carbonate is particularly preferably used.

The molecular weight of the polycarbonate resin is 10,000 to 50,000, preferably 13,000 to 30,000, particularly preferably 13,500 to 25,000 in terms of viscosity average molecular weight (M), from the viewpoint of the phase-separation structure or layer structure of the methyl methacrylate resin (component B) in the vibration-damping thermoplastic resin composition of the present invention. The viscosity average molecular weight is calculated by inserting the specific viscosity ($\eta_{sp}$) obtained from the solution obtained by dissolving 0.7 g of polycarbonate resin in 100 ml of methylene chloride at 20° C. in the following expression.

$$\eta_{sp}C=[\eta]+0.45\times[\eta]^2 c([\eta]: \text{intrinsic viscosity}) [\eta]=1.23\times 10^{-4} M^{0.83} c=0.7$$

When the viscosity average molecular weight is lower than 10,000, the strength is insufficient, while when it is higher than 50,000, the dispersion of the methyl methacrylate resin (component B) is insufficient, so that a layer structure which is effective-for vibration damping is not formed satisfactorily.

After produced by a conventionally known general method (such as a solution-polymerization method or a melt-polymerization method), the polycarbonate resin used as a raw material is preferably subjected to microfiltration in a solution state or washed, for example, with a poor solvent such as acetone under heat after granulated (or the solvent is removed) to remove foreign matters and impurities such as low-molecular-weight components and unreacted components In an extrusion step (pelletizing step) in which the polycarbonate resin is formed into pellets, the polycarbonate resin is preferably filtered in a molten state by a sintered metal filter having a filtration accuracy of 10 $\mu$m to remove the foreign matters. It is also preferable to add such additives as a phosphorus-based antioxidant as required. In any event, the contents of foreign matters, impurities, a solvent and the like in the raw material resin must be as low as possible to have good wet heat resistance.

The methyl methacrylate resin used as the component B in the resin composition of the present invention is obtained from a monomer comprising methyl methacrylate as a main component and is a homopolymer or copolymer of methyl methacrylate. Illustrative examples of the copolymerizable components in the copolymer include alkyl acrylates such as methyl acrylate, ethyl acrylate, propyl acrylate, isopropyl acrylate, butyl acrylate, amyl acrylate, hexyl acrylate, octyl acrylate, 2-ethylhexyl acrylate, cyclohexyl acrylate, dodecyl acrylate, octadecyl acrylate, phenyl acrylate and benzyl acrylate; alkyl methacrylates such as ethyl methacrylate, propyl methacrylate, isopropyl methacrylate, butyl methacrylate, amyl methacrylate, hexyl methacrylate, octyl methacrylate, 2-ethylhexyl methacrylate, cyclohexyl methacrylate, dodecyl methacrylate, octadecyl methacrylate, phenyl methacrylate and benzyl methacrylate; and copolymers thereof. They can be used solely or in combination of two or more.

The content of the methyl methacrylate component in the methyl methacrylate resin (component B) is preferably not lower than 80 wt %, more preferably not lower than 90 wt %, out of 100 wt % of the methyl methacrylate resin. Further, methyl acrylate is more preferably used as the copolymerizable component.

Further, the methyl methacrylate resin has a deflection temperature under load measured under a load of 1.82 MPa in accordance with ASTM D648 of not lower than 80° C. When the ethyl methacrylate resin has such deflection temperature under load, a vibration-damping thermoplastic resin composition having a better balance between vibration dampability and heat resistance can be attained.

As the component B of the present invention, a methyl methacrylate resin composition containing an acrylic elastic body may also be used. In this case, the content of the acrylic elastomer in the composition is desirably not higher than 50 wt %, preferably not higher than 40 wt %.

The acrylic elastomer contains acrylate rubber as an essential component as well as methyl methacrylate, alkyl acrylate whose alkyl group has 1 to 8 carbon atoms, styrene and, as required, a vinyl monomer which is copolymerizable with these, as copolymerizable components. The content of methyl methacrylate in the acrylic elastomer is 15 to 65 wt % out of 100 wt % of the elastomer. Styrene is preferably contained in the acrylic elastomer to further improve the vibration dampability of the methyl methacrylate resin.

The acrylate rubber in the present invention contains alkyl acrylate containing alkyl group having 2 to 10 carbon atoms and, as required, styrene, methyl methacrylate and butadiene as other copolymerizable components.

Preferable examples of the alkyl acrylate containing alkyl group having 2 to 10 carbon atoms include 2-ethylhexyl acrylate and n-butyl acrylate. The content of the alkyl acrylate is preferably not lower than 50 wt % out of 100 wt % of the acrylate rubber. Further, the acrylate rubber is partially crosslinked, and illustrative examples of the crosslinking agent include ethylene glycol diacrylate, butylene glycol diacrylate, ethylene glycol dimethacrylate, allyl methacrylate, and polypropylene glycol diacrylate. The crosslinking agent is preferably used in a proportion of 0.01 to 3 wt % in relation to the acrylate rubber.

Preferable forms of the acrylic elastomer are generally a core-shell structure and a multilayer structure which are obtained by multistage-polymerizing the acrylate rubber, methyl methacrylate, the alkyl acrylate whose alkyl group has 1 to 8 carbon atoms, styrene and, as required, a vinyl monomer which is copolymerizable with these. Further, the acrylic elastomer can be produced by any known method such as bulk polymerization, suspension polymerization, bulk-suspension polymerization, solution polymerization or emulsion polymerization. In the multistage polymerization, ungrafted on the graft base products may be contained.

An acrylic elastomer which can be preferably used as the above acrylic elastomer is such that a 2-mm-thick flat article molded from a resin composition obtained by adding 10 wt % of the acrylic elastomer to the methyl methacrylate resin has a total light transmittance at 23° C. and 50% RH of not lower than 85%. A more preferable acrylic elastomer is such that the molded article has a total light transmittance of not lower than 85% and a haze value measured under the same conditions of not higher than 7%.

Preferable examples of the methyl methacrylate resin containing the acrylic elastomer include such commercial products as Delpet SR series of Asahi Kasei Corporation, Acrypet IR series of Mitsubishi Rayon Co.,Ltd., and Sumipex B-HT series of Sumitomo Chemical Co., Ltd.

The contents of the above components A and B in the vibration-damping thermoplastic resin composition of the present invention are as follows. In the resin composition, when the total of the contents of the components A and B is 100 wt %, the content of the component A is 50 to 90 wt % and the content of the component B is 50 to 10 wt %. Preferably, the content of the component A is 60 to 85 wt % and the content of the component B is 40 to 15 wt %. More Preferably, the content of the component A is 65 to 80 wt % and the content of the component B is 35 to 20 wt %. When the content of the component B is lower than 10 wt %, vibration dampability is not satisfactory, while when it is higher than 50 wt %, heat resistance deteriorates.

Further, the thermoplastic resin composition of the present invention comprises the above components A and B subjectively, and an article molded therefrom satisfies the following characteristic properties.

The vibration-damping thermoplastic resin composition of the present invention must be molded to an article having a loss tangent (tan δ) value measured at 40° C. and 18 Hz in accordance with JIS K7198 of 0.04 to 0.08, preferably 0.05 to 0.07. When it is smaller than 0.04, vibration dampability is not satisfactory, while when it is larger than 0.08, dimensional accuracy is liable to be unsatisfactory.

The vibration-damping thermoplastic resin composition of the present invention must be molded to an article having a water absorption measured when immersed in water at 23° C. for 24 hours in accordance with ASTM D570 of not higher than 0.30 wt %, preferably not higher than 0.20 wt %. When the water absorption is higher than 0.30 wt %, good dimensional accuracy is not attained. When the component A of the present invention is an aromatic polycarbonate resin, a possible lower limit of the water absorption is 0.08 wt %.

The vibration-damping thermoplastic resin composition of the present invention must be molded to an article having a specific gravity measured in accordance with JIS K7112 of 1.05 to 1.3, preferably 1.05 to 1.25, more preferably 1.10 to 1.20. When the specific gravity is higher than 1.25, the molded article cannot have a desired light weight.

Further, vibration-damping thermoplastic resin composition of the present invention must be molded to an article having a deflection temperature under load measured under a load of 1.82 MPa in accordance with ASTM D648 of 110 to 170° C., preferably 120 to 160° C. When the deflection temperature is lower than 110° C., heat resistance is not satisfactory, while when it is higher than 170° C., a high temperature is required at the time of molding, so that the component B of the present invention is liable to be thermally degraded disadvantageously.

In the present invention, a platy filler (component C) can be further added for the purpose of improving rigidity and vibration dampability. Illustrative examples of the platy filler as the component C include glass flakes, mica, talc, metal flakes and a graphite filler. The average particle diameter of the platy filler is preferably 10 to 700 μm, more preferably 10 to 600 μm, much more preferably 10 to 400 μm. The above average particle diameter is calculated as a median diameter of the particle size weight distribution obtained by a standard sieve method using a standard wire sieve. When the average particle diameter is within the above range, the molded article can have better vibration dampability, rigidity and appearance.

Of the platy fillers usable as the component C in the present invention, the graphite filler can be more preferably used from the viewpoints of low specific gravity and vibration dampability. As the graphite filler, there can be used naturally occurring earthy graphite and scale-shaped graphite as well as artificial graphite obtained by crystallizing amorphous carbon obtained from coal, petroleum, coke or the like by applying heat to the amorphous carbon. The average particle diameter of the graphite is preferably 10 to 600 μm. more preferably 10 to 400 μm.

It is appropriate to add the component C in an amount of 5 to 20 parts by weight based on 100 parts by weight of the total of the components A and B. When the amount of the component C is within the above range, better vibration dampability and rigidity and a lower specific gravity can be attained at higher levels.

Carbon black may be further added to the vibration-damping thermoplastic resin composition of the present invention to impart antistatic properties to the composition. Preferable carbon black is conductive carbon black. Carbon black can be added in an amount of 1 to 15 parts by weight, preferably 2 to 13 parts by weight, based on 100 parts by weight of the total of the components A and B.

Further, a phosphorus-containing thermal stabilizer can be added to the vibration-damping thermoplastic resin composition of the present invention as required. Illustrative examples of the phosphorus-containing thermal stabilizer include phosphorous acid, phosphoric acid, phosphonous acid, phosphonic acid, and esters thereof. Specific examples of the phosphorus-containing thermal stabilizer include phosphite compounds such as triphenyl phosphate, tris-nonylphenyl phosphite, tris(2,4-di-tert-butylphenyl)phosphite, tridecyl phosphite, trioctyl phosphate, trioctadecyl phosphite, didecylmonophenyl phosphite, dioctylmonophenyl phosphite, diisopropylmonophenyl phosphate, monobutyldiphenyl phosphate, monodecyldiphenyl phosphate, monooctyldiphenyl phosphate, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, and bis(2,4-di-tert-butylphenyl)pentaerythritol diphosphite; phosphate compounds such as tributyl phosphate, trimethyl phosphate, tricresyl phosphate, triphenyl phosphate, trichlorophenyl phosphate, triethyl phosphate, diphenylcresyl phosphate, diphenylmonoorthoxenyl phosphate, tributoxyethyl phosphate, dibutyl phosphate, dioctyl phosphate and diisopropyl phosphate; and, as other phosphorus-containing thermal stabilizers, phosphonite compounds such as tetrakis(2,4-di-tert-butylphenyl)-4,4'-biphenylene diphosphonite, tetrakis(2,4-di-tert-butylphenyl)-4,3'-biphenylene diphosphonite, tetrakis(2,4-di-tert-butylphenyl)-3,3'-biphenylene diphosphonite and bis(2,4-di-tert-butylphenyl)-4-biphenylene phosphonite.

Of these, trisnonylphenyl phosphite, distearyl pentaerythritol diphosphite, bis(2,4-di-tert-butylphenyl)pentaerythritol diphosphite, tris(2,4-di-tert-butylphenyl)phosphite, triphenyl phosphate, trimethyl phosphate, tetrakis(2,4-di-tert-butylphenyl)-4,4'-biphenylene diphosphonite, and bis(2,4-di-tert-butylphenyl)-4-biphenylene phosphonite are preferable. These thermal stabilizers may be used solely or in admixture of two or more. The thermal stabilizer is added in an amount of preferably 0.0001 to 0.5 parts by weight, more preferably 0.0005 to 0.2 parts by weight, much more preferably 0.002 to 0.2 parts by weight, based on 100 parts by weight of the total of the components A and B.

Further, a generally known antioxidant can also be added to the vibration-damping thermoplastic resin composition of the present invention for the purpose of preventing oxidation. The antioxidant may be a phenolic antioxidant, for example. Specific examples of the phenolic antioxidant include pentaerythritol tetrakis(3-mercaptopropionate), pentaerythritol tetrakis(3-laurylthiopropionate), glycerol-3-stearyl thiopropionate, triethylene glycol-bis[3-(3-t-butyl-5-methyl-4-hydroxyphenyl) propionate], 1,6-hexanediol-bis[3-(3,5-di-t-butyl-4-hydroxyphenyl) propionate], pentaerythritol-tetrakis[3-(3,5-di-t-butyl-4-hydroxyphenyl) propionate], octadecyl-3-(3,5-di-t-butyl-4-hydroxyphenyl)propionate, 1,3,5-trimethyl-2,4,6-tris(3,5-di-t-butyl-4-hydroxybenzyl) benzene, N,N-hexamethylenebis(3,5-di-t-butyl-4-hydroxy-hydrocinnamide), 3,5-di-t-butyl-4-hydroxy-benzylphosphonate-diethylester, tris(3,5-di-t-butyl-4-hydroxybenzyl) isocyanurate, 4,4'-biphenylenediphosphinic acid tetrakis(2,4-di-t-butylphenyl), and 3,9-bis{1,1-dimethyl-2-[β-(3-t-butyl-4-hydroxy-5-methylphenyl)propionyloxy]ethyl}-2,4,8,10-tetraoxaspiro (5,5)undecane. The antioxidant is added in an amount of preferably 0.0001 to 0.5 parts by weight based on 100 parts by weight of the total of the components A and B.

Further, an ultraviolet absorber can also be added to the resin composition of the present invention. Illustrative examples of the ultraviolet absorber include benzophenone-based ultraviolet absorbers such as 2,2'-dihydroxy-4-methoxybenzophenone, and benzotriazole-based ultraviolet absorbers such as 2-(3-tert-butyl-5-methyl-2-hydroxyphenyl)-5-chlorobenzotriazole, 2-(3,5-di-tert-butyl-2-hydroxyphenyl)-5-chlorobenzotriaz ole, 2,2'-methylenebis[4-(1,1,3,3-tetramethylbutyl)-6-(2H-benzotriazole-2-yl)phenol], 2-[2-hydroxy-3,5-bis(α,α-dimethylbenzyl)phenyl]-2H-benzotriazole and 2-(3,5-di-tert-amyl-2-hydroxyphenyl) benzotriazole. Further, a hindered amine-based light stabilizer such as bis(2,2,6,6-tetramethyl-4-piperidyl) sebacate or bis(1,2,2,6,6-pentamethyl-4-piperidyl)sebacate can also be used. The ultraviolet absorber and the light stabilizer are added in an amount of preferably 0.01 to 5 parts by weight based on 100 parts by weight of the total of the components A and B, respectively.

Further, the higher fatty acid ester of polyhydric alcohol can also be added to the vibration-damping thermoplastic resin composition of the present invention as required. By adding the higher fatty acid ester, the thermal stability of the thermoplastic resin, the flowability of the resin at the time of molding and the releasability of a molded substrate from a mold are improved. The higher fatty acid ester is preferably a partial or whole ester of polyhydric alcohol having 2 to 5 carbon atoms and saturated fatty acid having 10 to 30 carbon atoms. Illustrative examples of the polyhydric alcohol include glycol, glycerol and pentaerythritol.

The above higher fatty acid ester is suitably added in an amount of 0.005 to 2 parts by weight, preferably 0.02 to 0.1 parts by weight, based on 100 parts by weight of the total of the components A and B of the present invention. When the amount is 0.005 to 2 parts by weight, the above effects can be attained without soiling a mold.

Further, to the thermoplastic resin composition of the present invention, there can also be added inorganic fillers such as glass fibers, carbon fibers, milled fibers, wollastonite, whiskers, carbon black, silica particles, titanium oxide particles and alumina particles; heat-resistance organic fillers such as aramid fibers, polyarylate fibers, polybenzothiazole fibers and aramid powders; halogen-containing flame retardants; phosphorus-containing flame retardants such as phosphate compounds, phosphate oligomers and red phosphorus; silicone-containing flame retardants; anti-dripping agents such as fibrillated fluorocarbon resins; lubricants such as silicone compounds, fluorine compounds and polyolefin wax; and other additives such as coloring agents, antistatic agents and flow modifiers, in such amounts that do not impair the characteristics of the present invention. Further, other thermoplastic resins can also be added in such small amounts that do not impair the object of the present invention.

The vibration-damping thermoplastic resin composition of the present invention can be produced by mixing the component A, the component B and the optional components by a mixing machine such as a tumbler, V-shaped blender, Nauta Mixer, Banbury mixer, kneading roll or extruder. More preferably, the composition is produced by melt-kneading the above components by an extruder, particularly a twin-screw extruder.

The thus-obtained vibration-damping thermoplastic resin composition is applicable to extrusion, injection molding, compression molding, blow molding, vacuum molding and the like and can be molded into parts for office automation equipment or the like which are excellent in dimensional accuracy, rigidity and heat resistance, low in weight and excellent in vibration dampability.

In this case, it is particularly preferable to produce the composition by injection molding. In this case, the parts can be produced not only by a general cold-runner molding method but also by a hot-runner molding method requiring no runner. Further, to carry out injection molding, there can be used, in addition to a general injection molding method, a variety of molding methods such as gas-assisted injection molding, injection compression molding, ultraspeed injection molding, coinjection molding, insert molding, in-mold coating molding and sandwich molding. Further, by using the composition as an internal layer or external layer of a molded article having a laminate structure produced by a complex molding method, the vibration dampability can be exhibited more effectively.

EXAMPLES

The present invention will be further described with reference to examples hereinafter. "Parts" and "%" in the examples mean "parts by weight" and "percent by weight", respectively.

Examples 1 to 15 and Comparative Examples 1 to 8

After mixed uniformly by a V-shaped blender, the components shown in Tables 1, 2 and 3 were melt-extruded into pellets by a 30-mm-Φ vented twin-screw extruder (HYPER KTX-30XST, product of Kobe Steel, Ltd.) at a cylinder temperature of 260° C. under a vacuum of 1,333 Pa produced by using a vacuum pump. The obtained pellets were dried by a hot-air-circulating dryer at 110° C. for 5 hours and molded into the test pieces for the following evaluations by an injection molding machine (model SG150U, product of Sumitomo Heavy Industries, Ltd.) at a cylinder temperature of 270° C. and a mold temperature of 80° C., and the test pieces were evaluated by the following evaluation methods.
(I) Physical Properties of Article Molded From Vibration-damping Thermoplastic Resin Composition
(1) water absorption: This was measured when immersed in water at 23° C. for 24 hours in accordance with ASTM D570.
(2) specific gravity: This was measured in accordance with JIS K7112.
(3) flexural modulus: This was measured at 23° C. in accordance with ASTM D790.
(4) deflection temperature under load: This was measured under a load of 1.82 MPa in accordance with ASTM D648.
(5) molding shrinkage ratio: This was determined by molding a square plate by using a mold for molding a square plate having a length of 100 mm, a width of 50 mm and a thickness of 4 mm, leaving the molded square plate stand under no load at 23° C. and 50% RH for 24 hours, measuring the sizes of the molded square plate in the flow direction and the direction perpendicular to the flow direction by a three-dimensional measuring apparatus (product of Mitutoyo Corporation), and measuring the sizes in the corresponding directions of the mold.
(II) loss tangent (tan δ) and Loss Factor of Article Molded from Vibration-damping Thermoplastic Resin Composition
(1) loss tangent (tan δ): The tan δ at 40° C. and 18 Hz was measured in accordance with JIS K7198. The measurement was carried out on a test piece having a thickness of 0.8 mm, a width of 2 mm and a distance between chucks of about 35 mm by an RSA-II viscoelasticity measuring apparatus of Rheometric Scientific F.E.Ltd. The loss tangent (tan δ) of the component A was also measured under the same conditions.
(2) loss factor (η): A strip test piece having a length of 80 mm, a width of 13 mm and a thickness of 1.2 mm was injection-molded under the same conditions under which the above test pieces for evaluating the physical properties was molded, and the loss factor at 40° C. of the strip test piece was measured by a cantilever beam method using a complex elastic modulus measuring apparatus (using multianalyzer system model 3560 of Brüel & Kjær, product of Matsushita Inter-Technb Co., Ltd.). As for the resonance frequencies in the examples of the present invention, a secondary resonance frequency was about 200 to 400 Hz, a tertiary resonance frequency was about 700 to 1,000 Hz, and a quaternary resonance frequency was about 1,400 to 2,200 Hz.

The symbols shown in Tables 1, 2 and 3 represents the following resin components and inorganic fillers.

PC1: An aromatic polycarbonate copolymer whose viscosity average molecular weight is 15,000 and whose aromatic dihydroxy components comprise 45 mol % of 1,1-bis(4-hydroxyphenyl)-3,3,5-trimethylcyclohexane [bisphenol TMC] and 55 mol % of 4,4'-(m-phenylenediisopropylidene)diphenol[bisphenol M] and which is obtained by a phosgene method using p-tert-butylphenol as a terminator.

PC2: An aromatic polycarbonate resin whose viscosity average molecular weight is 15,200 and whose aromatic dihydroxy component comprises 2,2-bis(4-hydroxyphenyl)propane [bisphenol A] and which is obtained by a phosgene method using p-tert-butylphenol as a terminator.

PO: cyclic polyolefin resin

["Zeonex E48R" of Nippon Zeon Co., Ltd.]

PAR: amorphous polyarylate resin

["U polymer U-8000" of UNITIKA LTD.]

ACRY1: methyl methacrylate/methyl acrylate copolymer (containing at least 90 wt % of methyl methacrylate)

[Delpet 80N of Asahi Kasei Corporation, MFR value measured in accordance with JIS K7210 (conditions: 280° C., 21.18 N)=22.3 g/10 min)]

ACRY2: mixture of methyl methacrylate/methyl acrylate copolymer and methyl methacrylate/butyl acrylate/styrene copolymer

[Delpet SR-8500 of Asahi Kasei Corporation] (component C)

Graphite 1: natural graphite ("scale-shaped graphite(5098)" of Nippon Sheet Glass Co., Ltd., average particle diameter: 350 μm) Graphite 2: natural graphite ("scale-shaped graphite(20085)" of Nippon Sheet Glass Co., Ltd., average particle diameter: 35 μm) (component D)

carbon black: acetylene black

["Denka Black" of Denki Kagaku Kogyo Kabushiki Kaisha] (other component)

stabilizer: trimethyl phosphate [TMP of Daihachi Kagaku Co., Ltd.]

TABLE 1

| | | Raw materials or properties | Composition ratio or unit | Ex. 1 | Ex. 2 | Ex. 3 | Ex. 4 | Ex. 5 |
|---|---|---|---|---|---|---|---|---|
| Mixing ratio of raw materials | Resin components | PC1 | % by weight | 70 | 70 | 70 | 70 | 70 |
| | | PC2 | % by weight | | | | | |
| | | PO | % by weight | | | | | |
| | | PAR | % by weight | | | | | |
| | | ACRY1 | % by weight | 30 | 30 | 30 | | |
| | | ACRY2 | % by weight | | | | 30 | 30 |
| | Total | | Parts by weight | 100 | 100 | 100 | 100 | 100 |
| | Component C | Graphite 1 | Parts by weight | | 5 | 10 | | 10 |
| | Component D | carbon black | Parts by weight | | | | | |
| | Other component | stabilizer | Parts by weight | 0.1 | 0.1 | 0.1 | 0.1 | 0.1 |
| Properties of resin composition | | Specific gravity | — | 1.15 | 1.18 | 1.20 | 1.13 | 1.19 |
| | | Water absorption | % by weight | 0.18 | 0.17 | 0.16 | 0.20 | 0.18 |
| | | Flexural modulus | MPa | 2,740 | 3,330 | 3,920 | 2,060 | 2,650 |
| | | Deflection temperature under load | ° C. | 115 | 118 | 120 | 112 | 115 |
| | | Molding shrinkage ratio (in flow direction) | % | 0.55 | 0.45 | 0.35 | 0.60 | 0.40 |
| | | Molding shrinkage ratio (in the direction perpendicular to the flow direction) | % | 0.55 | 0.45 | 0.35 | 0.60 | 0.40 |
| Vibration dampability | | tan δ (40° C.) | — | 0.045 | 0.050 | 0.055 | 0.050 | 0.055 |
| | | Loss factor (40° C.) | secondary | 0.050 | 0.050 | 0.050 | 0.050 | 0.050 |
| | | | tertiary | 0.050 | 0.050 | 0.050 | 0.050 | 0.050 |
| | | | quaternary | 0.050 | 0.050 | 0.050 | 0.050 | 0.050 |

| | | Raw materials or properties | Composition ratio or unit | Ex. 6 | Ex. 7 | Ex. 8 | Ex. 9 | Ex. 10 |
|---|---|---|---|---|---|---|---|---|
| Mixing ratio of raw materials | Resin components | PC1 | % by weight | 70 | 50 | 50 | 70 | 35 |
| | | PC2 | % by weight | | | | | 35 |
| | | PO | % by weight | | 20 | | | |
| | | PAR | % by weight | | | 20 | | |
| | | ACRY1 | % by weight | 15 | 30 | 30 | 30 | 30 |
| | | ACRY2 | % by weight | 15 | | | | |
| | Total | | Parts by weight | 100 | 100 | 100 | 100 | 100 |
| | Component C | Graphite 1 | Parts by weight | 10 | 10 | 10 | | 10 |
| | Component D | carbon black | Parts by weight | | | | 10 | |
| | Other component | stabilizer | Parts by weight | 0.1 | 0.1 | 0.1 | 0.1 | 0.1 |
| Properties of resin composition | | Specific gravity | — | 1.19 | 1.18 | 1.23 | 1.20 | 1.20 |
| | | Water absorption | % by weight | 0.17 | 0.14 | 0.16 | 0.16 | 0.20 |
| | | Flexural modulus | MPa | 2,350 | 3,430 | 3,630 | 3,430 | 3,330 |
| | | Deflection temperature under load | ° C. | 113 | 120 | 114 | 116 | 120 |
| | | Molding shrinkage ratio (in flow direction) | % | 0.35 | 0.55 | 0.60 | 0.45 | 0.35 |
| | | Molding shrinkage ratio (in the direction perpendicular to the flow direction) | % | 0.35 | 0.55 | 0.60 | 0.45 | 0.35 |
| Vibration dampability | | tan δ (40° C.) | — | 0.055 | 0.050 | 0.050 | 0.045 | 0.045 |
| | | Loss factor (40° C.) | secondary | 0.050 | 0.045 | 0.045 | 0.045 | 0.045 |
| | | | tertiary | 0.050 | 0.045 | 0.045 | 0.045 | 0.045 |
| | | | quaternary | 0.050 | 0.045 | 0.045 | 0.045 | 0.045 |

Ex.: Example

TABLE 2

| | | Raw materials of properties | Composition ratio or unit | C. Ex. 1 | C. Ex. 2 | C. Ex. 3 | C. EX. 4 | C. Ex. 5 | C. Ex. 6 | C. Ex. 7 |
|---|---|---|---|---|---|---|---|---|---|---|
| Mixing ratio of raw materials | Resin components | PC1 | % by weight | 100 | | 50 | | 70 | 70 | |
| | | PC2 | % by weight | | 100 | 50 | | | | 70 |
| | | PO | % by weight | | | | | 30 | | |
| | | PAR | % by weight | | | | | | 30 | |
| | | ACRY1 | % by weight | | | | 100 | | | 30 |
| | | ACRY2 | % by weight | | | | | | | |
| | Total | | Parts by weight | 100 | 100 | 100 | 100 | 100 | 100 | 100 |
| | Component C | Graphite 1 | Parts by weight | | | | | | | |
| | Component D | carbon black | Parts by weight | | | | | | | |
| | Other component | stabilizer | Parts by weight | 0.1 | 0.1 | 0.1 | 0.1 | 0.1 | 0.1 | 0.1 |

TABLE 2-continued

|  | Raw materials of properties | Composition ratio or unit | C. Ex. 1 | C. Ex. 2 | C. Ex. 3 | C. EX. 4 | C. Ex. 5 | C. Ex. 6 | C. Ex. 7 |
|---|---|---|---|---|---|---|---|---|---|
| Properties of resin composition | Specific gravity | — | 1.13 | 1.20 | 1.16 | 1.19 | 1.10 | 1.17 | 1.20 |
|  | Water absorption | % by weight | 0.12 | 0.20 | 0.16 | 0.32 | 0.08 | 0.11 | 0.24 |
|  | Flexural modulus | MPa | 2,550 | 2,350 | 2,450 | 3,140 | 2,550 | 2,650 | 2,550 |
|  | Deflection temperature under load | °C. | 128 | 126 | 127 | 100 | 127 | 122 | 113 |
|  | Molding shrinkage ratio (in flow direction) | % | 0.60 | 0.70 | 0.65 | 0.55 | 0.65 | 0.75 | 0.60 |
|  | Molding shrinkage ratio (in the direction perpendicular to the flow direction) | % | 0.60 | 0.70 | 0.65 | 0.55 | 0.65 | 0.75 | 0.60 |
| Vibration dampability | tan δ (40° C.) |  | 0.016 | 0.004 | 0.011 | 0.085 | 0.013 | 0.013 | 0.040 |
|  | Loss factor (40° C.) | secondary | 0.020 | 0.005 | 0.015 | 0.090 | 0.015 | 0.015 | 0.030 |
|  |  | tertiary | 0.025 | 0.005 | 0.015 | 0.090 | 0.020 | 0.020 | 0.030 |
|  |  | quaternary | 0.025 | 0.005 | 0.015 | 0.090 | 0.020 | 0.020 | 0.030 |

C. Ex.: Comparative Example

TABLE 3

|  |  | Raw materials or properties | Composition ratio or unit | C. Ex. 8 | Ex. 11 | Ex. 12 | Ex. 13 | Ex. 14 | Ex. 15 |
|---|---|---|---|---|---|---|---|---|---|
| Mixing ratio of raw materials | Resin components | PC1 | % by weight |  | 70 | 70 |  |  |  |
|  |  | PC2 | % by weight |  |  |  |  |  |  |
|  |  | PO | % by weight | 100 |  |  | 70 | 70 | 70 |
|  |  | PAR | % by weight |  |  |  |  |  |  |
|  |  | ACRY1 | % by weight |  | 30 | 30 | 30 | 30 | 30 |
|  |  | ACRY2 | % by weight |  |  |  |  |  |  |
|  | Total |  | Parts by weight |  | 100 | 100 | 100 | 100 | 100 |
|  | Component C | Graphite 1 | Parts by weight |  |  |  |  |  |  |
|  | Component C | Graphite 2 | Parts by weight |  | 10 | 10 | 10 |  | 10 |
|  | Component D | carbon black | Parts by weight |  |  | 10 |  | 10 | 10 |
|  | Other component | stabilizer | Parts by weight |  | 0.1 | 0.1 |  |  |  |
| Properties of resin composition | Specific gravity |  |  | 1.01 | 1.21 | 1.23 | 1.11 | 1.10 | 1.14 |
|  | Water absorption |  | % by weight | 0.01 | 0.16 | 0.14 | 0.09 | 0.09 | 0.08 |
|  | Flexural modulus |  | MPa | 2,100 | 4,010 | 4,940 | 3,820 | 3,300 | 4,790 |
|  | Deflection temperature under load |  | °C. | 123 | 120 | 118 | 119 | 115 | 116 |
|  | Molding shrinkage ratio (in flow direction) |  | % | 0.60 | 0.35 | 0.30 | 0.40 | 0.50 | 0.45 |
|  | Molding shrinkage ratio (in the direction perpendicular to the flow direction) |  | % | 0.60 | 0.35 | 0.30 | 0.40 | 0.50 | 0.45 |
| Vibration dampability | tan δ (40° C.) |  |  | 0.015 | 0.055 | 0.060 | 0.050 | 0.045 | 0.055 |
|  | Loss factor (40° C.) |  | secondary | 0.015 | 0.050 | 0.060 | 0.045 | 0.045 | 0.050 |
|  |  |  | tertiary | 0.015 | 0.050 | 0.060 | 0.045 | 0.045 | 0.050 |
|  |  |  | quaternary | 0.015 | 0.050 | 0.060 | 0.045 | 0.045 | 0.050 |

Ex.: Example, C. Ex.: Comparative Example

Comparing the cases in Tables 1 to 3 (Comparative Examples 1 and 2) where the aromatic polycarbonate resin is solely used, the aromatic polycarbonate resin comprising a bisphenol TMC/bisphenol M copolymer which is used as the component A of the present invention in the examples has higher vibration dampability, lower specific gravity, lower water absorption and higher flexural modulus than the aromatic polycarbonate resin comprising bisphenol A alone. As is understood from this, when Example 1 and Comparative Example 7 are compared with each other, it is understood that by using the aromatic polycarbonate comprising a bisphenol TMC/bisphenol M copolymer and adding the methyl methacrylate resin (component B) and the platy filler (component C), the loss tangent (tan δ) and the loss factor are increased. Further, it is also understood that the vibration dampability further improves as the amounts of the components B and C increase. Further, it is understood that a molded article having high vibration dampability can also be obtained by using a combination of the aromatic polycarbonate resin and a cyclic polyolefin or a polyarylate as the component A as in Examples 7 and 8.

In addition, it is also understood from Examples 13 to 15 that a molded article having excellent vibration dampability can be obtained when a cyclic polyolefin resin is used as the component A.

Effect of the Invention

An article molded from the vibration-damping thermoplastic resin composition of the present invention is excellent in vibration dampability as well as dimensional accuracy, rigidity and heat resistance, light in weight and useful in a variety of fields as of electronic, electric and information equipment, automobiles, machine parts and the like. Particularly, it is used as a turntable for an optical disk and precision instrument parts including the turntable in addition to high-speed revolving parts requiring the above properties at high levels (such as turntables for a variety of optical disks, polygon mirrors in an optical printer and supporting boxes therefor). Further, it is also useful in the fields of electronic, electric and information equipment such as office automation equipment, and its effects on the industry are significantly larger.

What is claimed is:

1. A vibration-damping thermoplastic composition comprising (a) 50 to 90 wt % of an amorphous thermoplastic resin (component A) having a loss tangent (tan δ) value measured at 40° C. and 18 Hz in accordance with JIS K7198 of 0.01 to 0.04 and a deflection temperature under load measured under a load of 1.82 MPa in accordance with ASTM D648 of not lower than 120° C. and (b) 50 to 10 wt % of a methyl methacrylate resin (Component B), wherein an article molded from the resin composition has the following physical properties (1) to (4), i.e., (1) a loss factor (η) of 0.04 to 0.08, (2) a water absorption measured when immersed in water at 23° C. for 24 hours in accordance with ASTM D570 of not higher than 0.20 wt %, (3) a specific gravity measured in accordance with JIS K7112 of 1.05 to 1.3, and (4) a deflection temperature under load measured under a load of 1.82 MPa in accordance with ASTM D648 of 110° C. to 170° C.

2. The vibration-damping thermoplastic composition of claim 1, which further contains a plate filler (component C) in an amount of 5 to 20 parts by weight based on 100 parts by weight of the total of the components A and B.

3. The vibration-damping thermoplastic composition of claim 2, wherein the component C is a graphite filler.

4. The vibration-damping thermoplastic composition of claim 1, wherein the content of the component A is 60 to 85 wt % and the content of the component B is 40 to 15 wt % when the total of the contents of the components A and B is 100 wt %.

5. The vibration-damping thermoplastic composition of claim 1, wherein the component A has a loss tangent (tan δ) value of 0.012 to 0.035.

6. The vibration-damping thermoplastic composition of claim 1, wherein the component A has a deflection temperature under load of not lower than 122° C.

7. The vibration-damping thermoplastic composition of claim 1, wherein the component A is an aromatic polycarbonate resin or a cyclic polyolefin resin.

8. The vibration-damping thermoplastic composition of claim 1, wherein the component A is an aromatic polycarbonate resin.

9. The vibration-damping thermoplastic composition of claim 1, wherein the component A is an aromatic polycarbonate resin which contains (a) 1,1-bis(4-hydroxyphenyl)-3,3,5-trimethylcyclohexane (component a) and (b) at least one aromatic dihydroxy component (component b) selected from 4,4'-(m-phenylenediisopropylidene)diphenol and 2,2-bis(3-methyl-4-hydroxyphenyl)propane in an amount of at least 80 mol % out of 100 mol % of the total of all aromatic dihydroxy components and which contains the component a and the component b in a molar ratio of 20:80 to 80:20.

10. The vibration-damping thermoplastic composition of claim 9, wherein the component b is 4,4'-(m-phenylenediisopropylidene)diphenol.

11. The vibration-damping thermoplastic composition of claim 1, wherein the component B has a deflection temperature under load of not lower than 80° C.

12. The vibration-damping thermoplastic composition of claim 1, wherein the content of methyl methacrylate component in the component B is not lower than 80 wt %.

13. The vibration-damping thermoplastic composition of claim 2, wherein the component C is a plate filler having an average particle diameter of 10 to 700 μm.

14. The vibration-damping thermoplastic composition of claim 1, wherein an article molded from the composition has a loss factor (η) of 0.05 to 0.07.

15. The vibration-damping thermoplastic composition of claim 1, wherein an article molded from the composition has a specific gravity of 1.05 to 1.25.

16. The vibration-damping thermoplastic composition of claim 1, wherein an article molded from the composition has a deflection temperature under load of 120 to 160° C.

17. A vibration-damping article molded from the resin composition of claim 1.

18. A vibration-damping high-speed revolving member or supporting member thereof which is molded from the resin composition of claim 1.

19. Use of the resin composition of claim 1 for a vibration-damping high-speed revolving member or supporting member thereof.

20. A method for producing a vibration-damping high-speed revolving member or supporting member thereof by melt-molding the resin composition of claim 1.

21. The vibration-damping thermoplastic composition of claim 1 which further contains carbon black (component D) in an amount of 1 to 15 parts by weight based on 100 parts by weight of the total of the components A and B.

22. The vibration-damping thermoplastic composition of claim 2 which further contains carbon black (component D) in an amount of 1 to 15 parts by weight based on 100 parts by weight of the total of the components A and B.

* * * * *